United States Patent [19]

Sauvée et al.

[11] Patent Number: 4,709,550
[45] Date of Patent: Dec. 1, 1987

[54] HYDRAULIC ASSISTANCE DEVICE

[75] Inventors: Jean P. Sauvée, Aubervilliers; Christian Riquart, Paris; Roland Levrai, Stains, all of France

[73] Assignee: Societe Anonyme D.B.A., Paris, France

[21] Appl. No.: 691,346

[22] Filed: Jan. 14, 1985

[30] Foreign Application Priority Data

Jan. 31, 1984 [FR] France ............................ 84 01439

[51] Int. Cl.[4] ............................................. B60T 11/20
[52] U.S. Cl. ................................... 60/562; 60/566; 91/460; 91/524
[58] Field of Search ................. 60/547.1, 555, 557, 60/560, 562, 581, 563, 582, 566, 565; 91/510, 460, 524

[56] References Cited

U.S. PATENT DOCUMENTS

| 2,799,140 | 7/1957 | Osborne | 60/563 |
| 3,659,421 | 5/1972 | Wilson et al. | 60/562 |
| 3,827,242 | 8/1974 | Belart | 60/582 |
| 3,918,765 | 11/1975 | Hayashida | 60/582 |
| 4,441,319 | 4/1984 | Brown | 60/562 |
| 4,534,171 | 8/1985 | Leiber | 60/563 |

Primary Examiner—Abraham Hershkovitz
Attorney, Agent, or Firm—Ronald D. Welch; Ken C. Decker

[57] ABSTRACT

The hydraulic assistance device incorporates a casing (10) enclosing first and second sliding components (18, 20) arranged in line, the first component (18) being capable of being displaced under the effect of the displacement of a pushrod (34) and the second component being capable of being displaced through the intermediary of a hydrostatic connection, and associated with each component (18, 20) is a valve mechanism (36, 46) in a respective hydraulic circuit between a source of fluid under pressure and a respective braking circuit (I, II), characterized in that the first and second components (18, 20) each constitute a piston sliding in a bore (14) in the casing (10) and each encloses a valve assembly (26, 40; 36, 46) each controlled by a plunger (30, 44), the plunger (30) of the first valve assembly (26, 36) being actuated by the pushrod (34), and the plunger (44) of the second valve assembly (40, 46) being actuated by the hydrostatic connection between the two pistons (18, 20).

5 Claims, 1 Drawing Figure

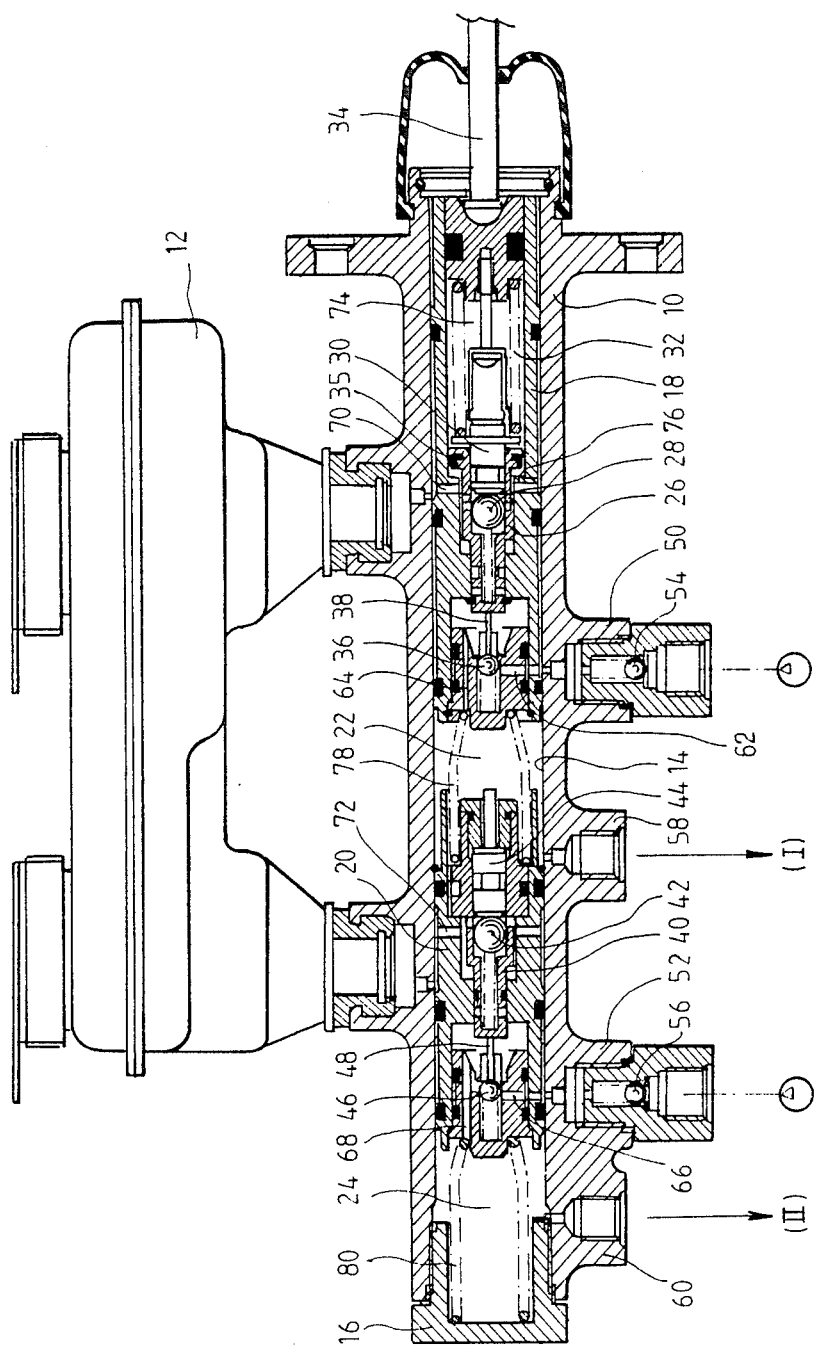

HYDRAULIC ASSISTANCE DEVICE

The present invention is concerned with hydraulic assistance devices and more particularly with such a device for a twin braking circuit with hydrodynamic operation (more commonly called "full power") and hydrostatic operation.

A hydraulic control, particularly for a braking device for a motor vehicle, is known from British Patent Application No. 2,051,985. The device incorporates a casing in which are mounted so as to slide two pistons joined together by a hydraulic hydrostatic connection in such a way that when a force is applied to one of the pistons by the brake pedal, the piston is displaced and causes the displacement of the second piston. Each piston forms a slide valve which forms part of a respective hydraulic circuit which incorporates a source of fluid under pressure and the brakes of the vehicle. During an application of the brake pedal, the pistons are displaced and open the braking circuits. The system thus described has disadvantages in that a failure of a source of fluid under pressure causes breakdown of the respective braking circuit; the hydraulic control not being capable of operating as a normal master cylinder (hydrostatically).

A solution to the disadvantages of the device described above is proposed in French Patent Application No. 83/17,892 in the name of the Applicant Company. The said application describes a hydraulic amplifier which is joined to a conventional master cylinder and which can form a valve in a high pressure braking circuit, which, in case of failure, can act as a hydrostatic master cylinder. Despite its obvious advantages, the system has nevertheless slight disadvantages because such an amplifier can only be used for a single braking circuit; a twin circuit necessitating two similar parallel amplifiers.

The aim of the invention is therefore to propose a hydraulic assistance device for a twin braking circuit capable of operating as a normal tandem master cylinder in the case of breakdown of the high pressure circuit, which is of simple construction, of low manufacturing cost and increased reliability.

To achieve this the invention concerns a hydraulic assistance device incorporating a casing enclosing first and second sliding components arranged in line, the first component being capable of being displaced under the effect of the displacement of a pushrod and the second component being capable of being displaced through the intermediary of a hydrostatic connection, and associated with each component is a valve means in a respective hydraulic circuit between a source of fluid under pressure and a respective braking circuit, characterized in that the first and second components each constitute a piston sliding in a bore in the casing and each encloses a valve assembly each controlled by a plunger, the plunger of the first valve assembly being actuated by the pushrod and the plunger of the second valve assembly being actuated by the hydrostatic connection between the two pistons.

Other characteristics and advantages of the present invention will emerge from the following description of an embodiment given by way of illustration which is not limiting, with reference to the accompanying drawing, in which:

The single FIGURE is a view in longitudinal section of a hydraulic assistance device according to the invention.

The hydraulic assistance device incorporates a casing 10 on which is mounted a twin reservoir 12 for hydraulic fluid. The casing 10 incorporates, in the example shown, a single bore 14 closed at one end by a closing component 16. In the bore 14 are mounted so as to slide first and second sleeves 18, 20, respectively, which define between them a first pressure chamber 22. A second pressure chamber 24 is defined between the second sleeve 20 and the closing component 16. The first sleeve 18 incorporates a first piston 26 which itself incorporates a non-return ball valve 28 capable of being displaced by a control component 30 mounted so as to slide in the first piston 26. The first piston 26 also incorporates an annular valve 35. The control component 30 is joined by a spring for pedal "feel" 32 to a pushrod 34 which is joined to the braking pedal of the vehicle (not shown). The first sleeve 18 incorporates in addition a control ball valve 36 which is capable of being displaced through the intermediary of a rod 38 under the effect of the displacement of the first piston 26.

In the same way as for the first sleeve 18, the second sleeve 20 incorporates a second piston 40 provided with a non-return ball valve 42 which is capable of being displaced by a control component 44 mounted so as to slide in the second piston 40. Similarly, the second sleeve also incorporates a control valve 46 capable of being displaced through the intermediary of a rod 48 under the effect of the second piston 40.

The casing 10 incorporates two inlet bosses 50, 52 each incorporating a non-return ball valve 54, and 56, respectively, and intended to be joined to a respective source of high pressure hydraulic fluid. The casing 10 is also provided with two outlet bosses 58, 60 each joined to a respective braking circuit (I) and (II).

The operation of the device thus described is as follows. A force, applied by the braking pedal on the pushrod 34, is transmitted through the intermediary of the spring 32 to the control component 30 which moves to the left, referring to the drawing, and closes the ball valve 28. The first piston 26 then moves relative to the sleeve 18 and opens the control valve 36 through the intermediary of the rod 38. Opening the control valve 36 allows the fluid under pressure to flow from the inlet 50 through a passage 62 and a bore 64 into the body of the valve 36 as far as the first pressure chamber 22 and the outlet 58. The rise in pressure of the primary circuit causes the first piston 26 to retract, which is in equilibrium with the spring for pedal "feel" 32. The rise in pressure in the first pressure chamber 22 also causes the displacement of the control component 44, and hence the closure of the ball valve 42 and the displacement of the second piston 40 to the left. This displacement of the second piston 40 relative to the sleeve 20 causes the control valve 46 to open through the intermediary of the rod 48. Opening the control valve 46 allows fluid under pressure to flow from the inlet 52 through a passage 66 and a bore 68 formed in the body of the valve 46 as far as the second pressure chamber 24 where the fluid pressure rises until the pressures of the primary circuit (I) and the secondary circuit (II) are in equilibrium. After the braking pedal is released, the replenishment of the two circuits is carried out by reopening the two ball valves 28 and 42 which allows hydraulic fluid from the reservoir 12 to flow through passages 70 and 72.

The operation of the device in the case of possible failure of the hydraulic circuits is now studied:

(1) In the case of failure of the sources of fluid under pressure for both circuits, when the brake pedal is actuated, the displacement of the pushrod 34 causes the ball valve 28 to close and the control valve 36 to open. As the source of fluid under pressure no longer exists, the first piston 26 moves to the left beyond the equilibrium position of the control valve 36 until the chamber 74 is closed by the annular valve 35 which comes into abutment against an annular surface 76 of the first sleeve 18. The chamber 74 being closed, the pushrod 34 is thrust against a hydraulic wall which prevents the compression of the spring for pedal "feel" 32 and drives the sleeve 18 in translation. The pressure in the primary circuit (I) rises, isolated from its reservoir and from its source of fluid under pressure by the closure of the ball valve 54. The rise in pressure of the primary circuit causes closure of the ball valve 42, opening of the control valve 46 and displacement of the second piston 40 until it comes into abutment against the sleeve 20. The sleeve 20 then moves to the left and, the ball valve 56 being closed, the pressure in the secondary circuit (II) rises. After the brake pedal is released, two springs 78 and 80 return the sleeves 18 and 20.

(2) Failure of the source of fluid under pressure of the primary circuit causes, during a braking application, closure of the valves 28 and 54, opening of the control valve 36 and closure of the annular valve 35 against the surface 76. Thus the pressure in the primary circuit (I) rises by displacement of the sleeve 18. This rise in pressure of the primary circuit causes normal operation of the secondary circuit (II). Braking pressure is identical in the two circuits, but is less than the normal pressure for hydrodynamic operation.

(3) In the case of failure of the source of fluid under pressure of the secondary circuit, the primary circuit operates normally with the spring for pedal "feel" 32. The pressure in the secondary faulty circuit rises under the effect of the displacement of the sleeve 20 after closure of the valves 42 and 56 and opening of the control valve 46. The braking pressure in the two circuits is identical and equivalent to that for normal operation.

(4) In the case of failure of the primary braking circuit (I) the first piston 26 moves until the annular valve 35 closes against the surface 76. The sleeve 18 then moves until it comes into abutment against the control component 44 which controls the pressure of the secondary circuit, operating alone. The spring for pedal "feel" 32 is neutralised by closure of the cup 35.

(5) In the case of failure of the secondary braking circuit (II) the primary circuit (operating alone) functions normally. The pressure in the secondary chamber 24 being nil, the sleeve 20 moves until it comes into abutment against the closing component 16.

We claim:

1. A hydraulic assistance device incorporating a casing enclosing first and second sliding components arranged in line, the first component being capable of being displaced under the effect of the displacement of a pushrod and the second component being capable of being displaced through the intermediary of a hydrostatic connection, and associated with each component is a valve means in a respective hydraulic circuit between a source of fluid under pressure and a respective braking circuit, characterized in that the first and second components each constitute a piston sliding in a bore in the casing and enclosing first and second valve assemblies each controlled by a plunger, the plunger of the first valve assembly being actuated by a pushrod, and the plunger of the second valve assembly being actuated by the hydrostatic connection between the two pistons.

2. A device according to claim 1, characterized in that each piston defines a respective pressure chamber joined to a respective braking circuit.

3. A device according to claim 2, characterized in that said valve assembly incorporates a first piston and an isolating ball situated in a cage mounted to slide into said first piston in response to actuation of said plunger mounted so as to slide in the cage and being mechanically coupled to the pushrod.

4. A device according to claim 3, characterized in that said first sliding component defines a third chamber in the first piston bounded on one side by the pushrod, the latter forming a thrust piston, and on another side by a collar forming a piston for the cage.

5. A device according to claim 1, characterized in that it incorporates a fluid reservoir, each pressure chamber being in hydraulic communication with the reservoir in the rest position of the device.

* * * * *